United States Patent [19]

Lee et al.

[11] 4,063,907

[45] * Dec. 20, 1977

[54] MODIFYING THE SURFACE OF DIAMOND PARTICLES

[75] Inventors: Minyoung Lee, Schenectady; Lawrence E. Szala, Scotia; Louis E. Hibbs, Jr., Schenectady, all of N.Y.

[73] Assignee: General Electric Company, Schenectady, N.Y.

[*] Notice: The portion of the term of this patent subsequent to Mar. 8, 1994, has been disclaimed.

[21] Appl. No.: 599,941

[22] Filed: July 28, 1975

[51] Int. Cl.² .......................... B24D 3/34; C23C 17/02
[52] U.S. Cl. .......................................... 51/295; 51/307; 51/309 R; 427/212; 427/214; 427/215; 427/217
[58] Field of Search ................. 51/295, 298, 308, 309, 51/307; 427/212, 215, 217, 214

[56] References Cited

U.S. PATENT DOCUMENTS

| 3,316,073 | 4/1967 | Kelso | 51/295 |
| 3,528,788 | 9/1970 | Seal | 51/295 |
| 3,585,013 | 6/1971 | Bruschek | 51/295 |
| 3,924,031 | 12/1975 | Nicholas et al. | 51/295 |
| 3,929,432 | 12/1975 | Caveney | 51/295 |

Primary Examiner—Donald J. Arnold
Attorney, Agent, or Firm—Jane M. Binkowski; Joseph T. Cohen; Jerome C. Squillaro

[57] ABSTRACT

Abrasive particles are prepared by milling diamond particles, metal compound and milling balls to smear a coating of the compound on the diamond particles and firing the compound-coated diamond particles producing a rough granular adherent covering of metal and/or metal carbide surface coating chemically bonded to the diamond surface by metal carbide.

6 Claims, 3 Drawing Figures

MODIFYING THE SURFACE OF DIAMOND PARTICLES

This invention relates to modifying the surface of diamond particles to produce novel coated particles useful as abrasive.

The superhard materials, diamond and cubic boron nitride, exhibit outstanding ability for machining both metallic and non-metallic materials. In particular, they perform well in the grinding mode. However, the maximum grinding performance is never attained because of the difficulty in retaining the abrasive particles in the grinding tool matrix or bond system. Premature gross pull-out of only partially used grit is still a major factor in grinding wheel wear, and this is particularly true for diamond particle abrasives, either natural or synthetic, in resin, vitreous or metal bonds.

Thus far a number of methods for modifying diamond particle surfaces in order to improve bond strength in tool matrices have been disclosed. For example, adherent films of molybdenum or chromium have been formed on diamond by sputtering or vapor deposition followed by appropriate heat treatment to form metal carbides. Molybdenum films have also been deposited on diamond by chemical and electrodeposition methods. However, as a practical matter, these techniques have certain specific drawbacks which prevent their usage. These processes are expensive and not suitable for coating large lots. In addition, the metal film thicknesses obtainable are small, and the surfaces of the resulting coatings are usually very smooth. Where the abrasive particles are to be used in resin bond systems, it is desirable to have rough coatings to provide a mechanical bond with the resin, because not much chemical bonding can be expected. In addition, a heavy coating of reasonable heat capacity is desirable, in order to act as a heat sink and reduce the maximum temperature at the abrasive-resin interface and retard thermal degradation of the polymeric material. A heavy coating, if firmly attached to the abrasive, may also increase its fracture toughness, providing the coating material thermal expansion matches that of the grit closely enough to avoid high interfacial stresses.

Because of the inherent difficulties in obtaining adherent coatings on diamond particles that meet the functional requirements of an abrasive, present practice is to effect a compromise by using thick coatings of metals that can easily be deposited by either chemical or electrodeposition methods. The most common are nickel or nickelphosphorous or copper. These are reasonably satisfactory for the heat sink function, and, if deposited under carefully controlled conditions, can be made rough enough to give a good mechanical bond to a resin wheel matrix. However, there is no bond between the surface of the diamond particle and these metal coatings thereby limiting abrasive life. In addition, these metal coatings cannot be used in either metal or vitreous bond systems because of their high thermal expansions compared to diamond, their relatively low melting points, and in the case of Ni-P, its metallurgical instability.

The process of the present invention produces coatings on diamond particles that overcome the shortcomings of the prior art. Adherent coatings can be applied, which are chemcially bonded by virtue of an intermediate metal carbide zone or layer. The coating metals include molybdenum and tungsten, or alloys thereof which closely match diamond in thermal expansion so as to produce low stress bonds.

Briefly stated, the present invention comprises a process for coating diamond particles to produce abrasive particles which comprises providing milling balls made of plastic or elastomer having a diameter ranging from about 1/16 inch to about ¼ inch, providing particles of a metal compound which is decomposible or reducible at atmospheric pressure at a temperature ranging from about 800° C to 1400° C to produce metal and gaseous product of decomposition, providing diamond particles ranging in size from about 10 microns to 2000 microns, milling said milling balls and said particles of metal compound and diamond mechanically smearing a coating of said metal compound onto the surface of said diamond particles coating said compound on at least 50 percent to about 100 percent of the surface area of said diamond particles, recovering the metal compound-coated diamond particles, and firing said metal compound-coated diamond particles in a reducing or inert atmosphere at a temperature ranging from at least about 800° C to 1400° C decomposing or reducing the metal compound and producing abrasive particles, said abrasive particle consisting essentially of a diamond particle having a rough granular adherent covering composed of an outside surface coating ranging in composition from metal to a carbide of said metal with all composition ratios, i.e. mixtures, of said metal and metal carbide falling within said range and a layer of carbide of said metal intermediate said surface coating and diamond chemically bonding said surface coating to said diamond, said granular covering being discontinuous or continuous and non-interconnecting or interconnecting and covering from at least about 50 percent to about 100 percent of the surface area of said diamond particle.

In carrying out the process, milling balls are used which are non-metallic and non-ceramic. Specifically, the milling balls of the present invention are made of plastic or elastomer. Examples of useful plastic are polyethylene, polypropylene and polystyrene. The elastomer can be natural or synthetic rubber. The balls should be sufficiently resilient so that during the milling step, the diamond particles do not cut into the balls and become lodged therein, or alternatively, crush the balls preventing proper mechanical smearing of the metal compound onto the diamond particles. Also, the milling balls should have sufficient elasticity so that they do not crush or chip the diamond particles.

The milling balls can vary in shape as long as such shape is effective in mechanically smearing the metal compound onto the surface of the diamond particles in accordance with the present process. For the best results, the surface of the balls should be round. Preferably, the balls are spherical but they can, for example, be cylindrical. They should have a diameter ranging from about 1/16 inch to about ¼ inch. Milling balls having a diameter significantly greater than ¼ inch are not suitable because they would result in an insufficient number of balls per unit volume to provide adequate surface area necessary to effectively coat the compound on the diamond particles whereas milling balls having a diameter less than 1/16 inch are too difficult to separate from the diamond particles. Where cylindrically shaped balls are used, they should not have a length greater than twice their diameter or less than about one-half their diameter.

The metal compound is used in the form of a particulate solid which can range in size from less than one micron to the size of the diamond particles being coated. Metal compound particles having a size significantly larger than that of the diamond particles are not effective because they do not provide sufficient surface area for proper mechanical smearing of the compound onto the surface of the diamond particles. However, compound particles larger than that of the diamond particles are useful if they crush during the ball milling step. Preferably, the particle size of the metal compound is about one-tenth the size of the diamond particles being coated.

The metal compound used in the present process is substantially completely decomposible or reducible at atmospheric pressure at a temperature ranging from about 800° C to 1400° C to metal and gaseous product or products of decomposition. Also, the metal compound is a layer lattice compound, i.e. a compound with a low shear strength between its lattice layers which allows layers of the compound particles to be rubbed off mechanically in the present ball milling step. Representative of the metal compounds useful in the present process is molybdenum sulfide ($MoS_2$), tungsten sulfide ($WS_2$), titanium sulfide ($TiS_2$), niobium sulfide ($NbS_2$), tantalum sulfide ($TaS_2$), chromium chloride ($CrCl_3$) and zirconium sulfide ($ZrS_2$).

The diamond crystals, i.e. particles, of the present invention include natural and synthetic or man-produced diamonds. The present diamond particles range in size from about 10 microns to about 2000 microns.

In carrying out the present process, the milling or ball milling step is carried out in a container or mill made of a non-metallic, non-ceramic material which does not crush or chip the diamond particles. Specifically, the container or mill is made of plastic such as polyethylene or of an elastomer such as natural or synthetic rubber. The extent to which the container is filled with milling balls, the amount of diamond particles and the amount of metal compound used is determinable empirically depending largely on the size of the balls and particles as well as the extent of the coating of metal compound on the diamond particles desired. Generally, the metal compound coating on the diamond particle ranges from about 2% to about 20% by weight of the diamond particle. For best results, about two-thirds of the container is filled with milling balls, and the diamond particles and metal compound particles are then added to the container. The milling step can be carried out in a conventional manner. Specifically, the mill or container can be rolled, preferably at a moderate rate of speed to prevent chipping of the diamond particles, using conventional ball milling apparatus. When the desired extent of compound is coated on the surface of the diamond particles, the coated diamond particles can be separated from the milling balls and any excess metal compound powder using suitable wire mesh sieves.

In a preferred embodiment of the present process which provides good control of the final product, the milling balls and metal compound particles are placed in the container and milled sufficiently to produce a coating of the metal compound on the milling balls. The compound-coated milling balls can then be separated from excess compound powder by a conventional technique such as by using suitable wire mesh sieves. The coated balls are then placed in the mill along with the diamond particles and milled whereby the compound-coating on the balls is mechanically smeared onto the diamond particles. In this way better control of the metal compound-coating on the diamond particles is achieved and separation of the resulting compound-coated diamond particles from the milling balls is more easily carried out by a conventional technique such as by using suitable wire mesh sieves.

The present process is controllable to produce the present coated diamond particle, i.e. abrasive particle in a number of embodiments, all of which have metal carbide chemically bonded to the surface of the diamond which forms during firing by solid state diffusion between the carbon of the diamond and the metal atoms of the initially deposited metal compound. Specifically, the abrasive particle consists essentially of diamond particle having an adherent covering composed of an outside surface coating ranging in composition from metal to a carbide of the same metal with all composition ratios, i.e. mixtures, of said metal and metal carbide, falling within said range and a layer of carbide of said metal intermediate said surface coating and diamond chemically bonding the surface coating to the diamond surface.

Those skilled in the art will gain a further and better understanding of the present invention from the figures accompanying and forming part of the specification, in which.

Figure 1:
FIG. 1 is a photomicrograph (magnified 1000 X) showing tungsten metal coated diamonds made by firing $WS_2$ coated diamonds in hydrogen at 800° C in accordance with the present process.

The present covering is rough and granular. It can range in structure from non-uniform to substantially uniform and from discontinuous to continuous. The more interconnecting or continuous the covering, the more contact it has with the diamond surface and the less likely it is to be chipped off. Also, the more uniform the granular structure, the less likely it is to be chipped off. Generally, in contrast to grains which are round, the structure of the grains in the present covering are flaky, flat-like or planar and it is the planar surface of the grains that is usually bonded, i.e. at which bonding is effected. The covering covers from at least 50 percent to about 100 percent of the surface area of the diamond particle.

The covering on the diamond particle, i.e. outside surface coating and intermediate carbide layer, can vary in thickness and generally ranges in thickness from about 1 micron to 100 microns. Specifically, the intermediate metal carbide layer can be as thin as 2 Angstroms and detectable by transmission microscopy with thicknesses of 3 Angstroms or greater detectable by X-ray diffraction analysis.

In the present process, the firing temperature ranges from about 800° C to about 1400° C and firing is preferably carried out at atmospheric pressure. Firing also should be carried out for a period of time sufficient to substantially or completely decompose or reduce the metal compound coating to produce the present covering of metal and/or metal carbide. Firing temperatures significantly higher than about 1400° C are not useful since they tend to graphitize the surface of the diamond which would be deleterious to grinding performance and would prevent adequate retention in metal or vitreous wheel bond systems.

The particular firing temperature used depends largely on the specific metal compound used, the firing atmosphere and the particular type of coated, i.e. covered, or etched abrasive particle desired. Generally, firing temperatures of about 800° C to 900° C produce a diamond particle having a covering composed of an outer surface coating of metal with a layer of carbide of the same metal intermediate the metal surface coating and diamond. At temperatures above 900° C, the outer surface coating is comprised of metal and carbide of the same metal, with the amount of metal decreasing with increasing firing temperature, or the outer surface coating can be entirely of metal carbide.

If desired, the uniformity and continuousness or interconnectivity of the covering can be significantly increased at relatively low firing temperatures ranging from about 800° C to about 1000° C by initially heating the compound-coated diamond particles in air at a temperature ranging from about 400° C to 700° C to convert the metal compound to metal oxide, and then firing the resulting oxide-coated particle in a reducing atmosphere such as hydrogen to reduce the oxide and produce the present covering. This resulting covering usually has a substantially webbed or feathery interconnecting structure which is highly adherent to the surface of the diamond.

The process of this invention also provides the capability of producing a stable etched surface for diamond which is essentially unique. Specifically, at firing temperatures ranging from about 1100° C to 11400° C, significant diffusion of metal carbide or metal and metal carbide over the surface of the diamond occurs accompanied by numerous localized diffusion reactions produced by metal atoms penetrating, i.e. etching, the diamond surface forming tracks of metal carbide therein resulting in a change in the contour of the diamond particle. The resulting abrasive particle consists essentially of diamond particle having a highly adherent significantly continuous covering of metal carbide. However, where an initially relatively thick deposit or coating is made, the covering may have a minor amount of metal in its outside surface coating so that such surface coating will consist essentially of a minor amount of metal and a major amount of metal carbide. Much of the covering, i.e. at least about 50%, is of a substantially uniform fine granular form, i.e. finer and more uniform than that normally obtained at firing temperatures below 1100° C, with a multitude of furrows usually substantially uniformly distributed therein and running significantly parallel to each other. These furrows are indicative of bonding of the covering below the surface of the diamond by the metal carbide tracks formed therein. Since this covering is adhered both to the surface and below the surface of the diamond, it cannot be broken away from the diamond in any significant amount without breaking part of the diamond particle. The metal carbide tracks etching, i.e. penetrating, the surface of the diamond particle are detectable by techniques such as X-ray diffraction analysis and by microprobe analysis.

The firing atmosphere used in the present process can be varied, i.e. it can be a reducing atmosphere such as hydrogen or it can be an inert atmosphere such as argon or a vacuum, but is should be an atmosphere which has no significant deleterious effect on the metal compound-coating or diamond particle or the resulting covering of metal and metal carbide. Generally, it is a reducing atmosphere such as hydrogen which reduces or reacts with the metal compound to produce the present adherent covering composed of metal and/or metal carbide coating and layer.

The firing step may be performed in a number of ways. For example, it can be carried out batchwise, or in a continuous manner using a fluidized bed, or a moving belt, in any suitable furnace using quartz, Vycor or alumina ceramic crucibles, depending upon maximum temperature used. No significant sintering of the fired diamond particles occurs in the present process, and the final fired coated diamond particles are easily broken up into a free flowing powder.

The present method provides a number of advantages. One advantage is that it automatically produces a very rough covering, which can be varied in both roughness and thickness through control of the milling step parameters and relative amount of input feed material. For example, with longer milling periods, larger amounts of input feed materials of finer size and smaller sized milling balls, thicker coatings of the metal compound of the diamond particles are produced resulting in thicker fired coverings of metal and/or metal carbide. Also, very rough fired coverings of metal and/or metal carbide can be produced by initially milling the diamond particles with a mixture of large and small sized particles of the metal compound thereby mechanically smearing a substantially uneven undulating deposit or coating on the diamond particle which, when fired, results in a correspondingly rough covering. Additional advantages are that the process equipment is inexpensive, and the technical process control requirements are minimal.

The coated, i.e. covered, diamond particles, i.e. abrasive particles, of this invention are suitable for use in all types of abrasive and cutting tools, for example, resin bond or metal bond abrasive tools, and saw abrasive tools.

The invention is further illustrated by the following examples where conditions were as follows unless otherwise noted:

The milling balls in each of the examples were sufficiently resilient so that during the milling or rolling step, the diamond particles did not cut into the balls and become lodged therein or crushed or chipped the balls.

All milling or rolling was carried out dry in air at room temperature on a conventional laboratory mill.

All firing was carried out in a ceramic tube furnace.

EXAMPLE 1

A clean polyethylene bottle, about 2⅜ inches high by ⅝ inch inside diameter was charged two-thirds full with polytetrafluoroethylene (Teflon) spheres, i.e. balls, which were a mixture of ¼ inch diameter balls and ⅛ inch diameter balls with the number of ⅛ inch diameter balls being used being about double that of the ¼ inch diameter balls. Three grams of powdered molybdenum sulfide, ($MoS_2$), having a particle size of less than 40 microns were also added to the bottle which was then closed and rolled, i.e. milled, on a laboratory mill, at 60 RPM for 24 hours. Examination of the resulting balls showed them to be uniformly coated with about 0.73 gram of $MoS_2$, the remainder being coated on the inside walls of the bottle. The coated balls, along with 2 grams of 100/120 mesh, i.e. about 125 microns to 149 microns in particle size, synthetic diamond, MGB (Metal Bond Grinding) "Man-Made™" diamonds, were placed in another identical clean bottle, together with an additional 0.120 gram of MoS₂ powder less than 40 microns in size, and rolled for 24 hours at 60 RPM on the laboratory mill. The balls and coated diamonds were then separated by suitable wire mesh sieves. The compound-coated diamonds weighed 2.130 grams, indicating a MoS₂ coating weight of 0.130 gram. About 80% of the surface area of the diamond particles was coated with MoS₂.

EXAMPLE 2

This example was carried out in the same manner as set forth in Example 1 except that all the Teflon balls had a diameter of ⅛ inch. The resulting MoS₂ coated diamond particles appeared similar to those produced in Example 1 with at least about 80% of the surface area of the diamond being coated except that the MoS₂ coating weight for 2 grams of diamonds was less, i.e. it was 0.082 gram.

EXAMPLE 3

The already MoS₂ coated Teflon balls and bottle which were used in Example 1 to coat diamonds were reused in this example without adding any additional MoS₂ powder to coat 2 grams of 100/120 mesh MBG diamond particles which were added to the bottle. The milling time was 40 hours at 60 RPM. The Teflon balls and coated diamonds were then separated by suitable wire mesh sieves. The resulting MoS₂ coated diamonds had a smoother coating than that obtained in Example 1 and covered at least 80% of the surface area of the diamond particles. The total MoS₂ coating weight on the diamond particles was 0.120 gram.

EXAMPLE 4

A clean polyethylene bottle identical to that used in Example 1 was charged two-thirds full with ⅛ inch long soft rubber cylinders and 1.5 grams of powdered MoS₂ having a particle size less than 40 microns. The bottle was then closed and rolled for 24 hours at 60 RPM. At the end of this time it appeared that substantially all of the MoS₂ powder coated the rubber cylinders and no significant amount of powder was left on the inside walls of the bottle.

EXAMPLE 5

A clean polyethylene bottle identical to that used in Example 1 was charged two-thirds full with ⅛ inch diameter Teflon balls and 2.5 grams tungsten sulfide (WS₂) powder having a particle size of less than 40 microns. The bottle was closed and rolled at 60 RPM for 24 hours. At the end of this time, examination showed essentially all the WS₂ was smeared onto the Teflon balls, with only 0.18 gram on the inside bottle walls. 2 grams of 100/120 mesh, i.e. about 125 microns to 149 microns in particle size, synthetic diamond particles, MBG (Metal Bond Grinding) "Man-Made™" diamonds, were then added to the bottle which was then closed and rolled for 48 hours at 60 RPM. A substantially smooth WS₂ coating was obtained which covered at least about 80% of the surface area of the diamond particles.

Samples of the compound coated diamond particles from Examples 1, 2, 3 and 5 were fired as indicated in Table I at various temperatures, and the resulting fired coatings examined.

TABLE I

Figure 2:
FIG. 2 is a photomicrograph (magnified about 1000 X) of molybdenum metal coated diamonds after reducing $MoO_3$ coating by firing in hydrogen at 800° C prepared in accordance with the present process.
Figure 3:
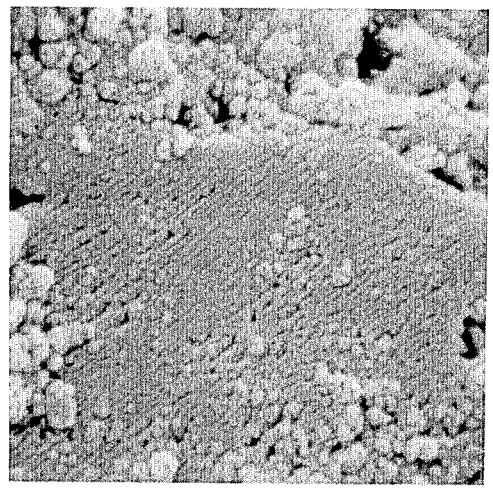
FIG. 3 is a photomicrograph (magnified 20,000 X) of the surface of a diamond particle obtained by firing molybdenum sulfide coated diamond in hydrogen at 1200° C prepared in accordance with the present process.

| Sample No. | From | Furnace Temp. | Time | Furnace Atmosphere | X-Ray Diffraction Results | Fired Covering |
|---|---|---|---|---|---|---|
| 1A | Example 1 | 970° C | 30 min. | H₂ | Mo₂C, diamond | Adherent, flaky-granular. |
| 1B-1 | Example 1 | 550° C | 15 min. | air | MoO₃, diamond | — |
| 1B-2 | 1B-1 | 800° C | 1 hour | H₂ | Mo, diamond | (Fig.2) Adherent, interconnecting, feathery-granular. |
| 1C | Example 1 | 1100° C | 30 min. | H₂ | Mo₂C, diamond | Adherent, substantially continuous, fine granular structure with parallel furrows distributed therein. |
| 1D | Example 1 | 800° C | 1 hour | H₂ | Mo₂C, diamond trace Mo | Adherent, flaky-granular. |
| 1E | Example 1 | 1200° C | 15 min. | H₂ | Mo₂C, diamond | (Fig.3) Similar to Sample No. 1C. |
| 3A | Example 3 | 800° C | 1 hour | H₂ | — | Adherent, flaky-granular molybdenum metal. |
| 3B | Example 3 | 1000° C | 30 min | H₂ | — | Adherent, flaky-granular molybdenum carbide. |
| 5A | Example 5 | 1000° C | 30 min. | H₂ | W, diamond | Adherent, flaky-granular tungsten metal. |
| 5B | Example 5 | 800° C | 1 hour | H₂ | W, diamond trace WS₂ | (Fig. 1) Adherent, flaky-granular tungsten metal. |
| 5C | Example 5 | 615° C | 1 hour | H₂ | WS₂, diamond | No conversion. |
| 5D | Example 5 | 1115° C | 30 min. | H₂ | W, W₂C, diamond | Similar to Fig. 3. |

All of the Sample Nos. in Table I, except Sample No. 5C, illustrate the present invention. Specifically, Sample Nos. 1A, 1D, 3A, 3B, 5A and 5B, illustrating the present invention, show that the morphologies of the coatings do not change significantly when fired in H₂ alone. FIG. 1, which shows tungsten metal covered diamond particles produced in Sample No. 5B, shows the flaky-flat-type granular structure produced by the present process. Sample Nos. 1B-1 and 1B-2 illustrate that the structure of the Mo coating or covering can be modified to a more interconnecting, feathery structure shown in FIG. 2 by first converting to MoO₃ by firing in air, followed by reduction in H₂. Sample Nos. 1C, 1E and 5D illustrate the present etched diamonds. Specifically, as illustrated by Sample Nos. 1C and 1E, reducing the MoS₂ coating at 1100° C or 1200° C in H₂ results in etching of the diamond surface in accordance with the present process as well as complete conversion of Mo to Mo₂C. FIG. 3, which shows the fired covering produced in Sample No. 1E, illustrates the fine granular continuous structure attained with significantly parallel furrows substantially uniformly distributed therein. In Sample 5D the fired covering was composed of W metal and W₂C.

In all of the Sample Nos. of Table I illustrating the present fired coverings, the fired coverings covered from at least about 70% to about 95% of the surface area of the diamond particles and ranged in thickness from about one micron to 100 microns. Also, in Sample Nos. 1B-2, 5A and 5B, the intermediate metal carbide bonding layer, although not shown by X-ray diffraction analysis, would have been detectable by transmission microscopy. Sample No. 5C showed no conversion because the firing temperature was too low.

EXAMPLE 6

In order to determine adhesive strength and abrasion resistance of the fired coverings of the present invention, fired specimens from Sample Nos. 1A, 1C, 5A and 5D were placed in small glass vials and shaken vigorously for 5 minutes, using a dental "wiggle-Bug," a device for mixing dental amalgam. After such shaking, although portions of the outside surface material broke off, microscopic examination of the specimens tested showed that the layer or covering bonded to the diamond surface remained adherent.

EXAMPLE 7

Synthetic diamond particles, 140/170 mesh, i.e. 105 microns to 88 microns in particle size, were used.

A portion of the diamond particles was coated with a coating of tungsten sulfide ($WS_2$) substantially as set forth in Example 5. The $WS_2$ coated diamond particles were fired at 1100° C for 1 hour in an atmosphere of hydrogen resulting in a fired covering of tungsten carbide ($W_2C$).

Another portion of the diamonds was coated with a coating of $WS_2$ substantially as set forth in Example 5. The resulting $WS_1$ coated diamond particles were fired at 1020° C for 1 hour in an atmosphere of hydrogen resulting in a fired coating of tungsten.

A third portion of the uncoated diamonds was used as a control.

Nickel in an amount of 56 weight % was deposited on all of the these diamond particles.

Dry Grinding Conditions were as follows:

| | |
|---|---|
| Wheel speed | 25 M/min. |
| Table speed | 1.5 M/min. |
| Infeed | .064 mm |
| Material | Cemented tungsten carbide cobalt |

Grinding results are shown in Table II:

Table II

Test results at 0.064 mm infeed:

| | Grinding Ratio |
|---|---|
| $W_2C$ coated diamonds | 33.8 |
| W coated diamonds | 33.1 |
| Control | 24.8 |

Test results at 0.076 mm infeed:

| | Grinding Ratio |
|---|---|
| $W_2C$ coated diamonds | 22.4 |
| W coated diamonds | 22.3 |
| Control | 18.4 |

The Grinding-Ratio is the ratio of the volume of material removed from the workpiece to the volume of grinding tool used during the grinding operation. Obviously, the higher the Grinding-Ratio the better the grinding properties of the particular grinding wheel. Table II shows higher grinding ratios for the coated diamond particles prepared according to the present invention.

U.S. Pat. application Ser. No. 599,942, now U.S. Pat. No. 4,011,064 filed of even data herewith in the names of Minyoung Lee, Lawrence E. Szala and Louis E. Hibbs, Jr. and assigned to the assignee hereof is directed to modifying the surface of cubic boron nitride particles. Specifically, abrasive particles are prepared by milling cubic boron nitride particles, metal compound and milling balls to smear a coating of the compound on the boron nitride particles and firing the compound-coated boron nitride particles producing a rough granular adherent covering of metal and/or metal boride and/or nitride surface coating chemically bonded to the boron nitride surface by metal boride and/or nitride.

What is claimed is:

1. A process for producing diamond abrasive particles having a rough adherent covering which comprises providing milling balls consisting essentially of plastic or elastomer having a diameter ranging from about 1/16 inch to about ¼ inch, providing particles of a metal compound which is decomposible or reducible at atmospheric pressure at a temperature ranging from about 800° C to 1400° C to produce metal and gaseous product of decomposition, said metal compound being selected from the group consisting of molybdenum sulfide, tungsten sulfide, titanium sulfide, niobium sulfide, tantalum sulfide, chromium chloride, zirconium sulfide, and mixtures thereof, providing diamond particles ranging in size from about 10 microns to 2000 microns, milling said milling balls and said particles of metal compound and diamond mechanically smearing a coating of said metal compound onto the surface of said diamond particles coating said compound on at least 50 percent to about 100 percent of the surface area of said diamond particles, said milling balls having a shape and sufficient elasticity and resiliency to effect said mechanical smearing, recovering the metal compound-coated diamond particles, and firing said metal compound-coated diamond particles in a reducing or inert atmosphere at a temperature ranging from at least about 800° C to 1400° C decomposing or reducing the metal compound and producing said abrasive particles, said abrasive particle consisting essentially of a diamond particle having a rough granular adherent covering consisting essentially of an outside surface coating ranging in composition from said metal to a carbide of said metal with all composition ratios of said metal and metal carbide falling within said range, and a layer of carbide of said metal intermediate said surface coating and said diamond particle chemically bonding said surface coating to said diamond particle, said covering being discontinuous or continuous and covering from at least 50 percent to about 100 percent of the surface area of said diamond particle.

2. The process according to claim 1 wherein said firing temperature ranges from about 1100° C to 1400° C producing penetration of the diamond surface with tracks of said metal carbide, and wherein said outside surface coating consists essentially of up to a minor amount of said metal and said metal carbide, and wherein said covering is significantly continuous with a significantly uniform fine granular structure with a multitude of furrows distributed therein running significantly parallel to each other.

3. A process for producing diamond abrasive particles having a rough adherent covering which comprises providing milling balls consisting essentially of plastic or elastomer having a diameter ranging from about 1/16 inch to about ½ inch, providing particles of a metal compound which is decomposible or reducible at atmospheric pressure at a temperature ranging from about 800° C to 1400° C to produce metal and gaseous product of decomposition, said metal compound being selected from the group consisting of molybdenum sulfide, tungsten sulfide, titanium sulfide, niobium sulfide, tantalum sulfide, chromium chloride, zirconium sulfide, and mixtures thereof, milling said milling balls and said particles of metal compound producing a coating of said compound on the milling balls, milling the resulting metal compound-coated milling balls with the diamond particles ranging in size from about 10 microns to 2000 microns mechanically smearing a coating of said metal compound onto the surface of said diamond particles coating said compound on at least 50 percent to about 100 percent of the surface area of said diamond particles, said milling balls having a shape and sufficient elasticity and resiliency to effect said mechanical smearing, recovering the metal compound-coated diamond particles, and firing said metal compound-coated diamond particles in a reducing or inert atmosphere at a temperature ranging from at least about 800° C to 1400° C decomposing or reducing the metal compound and producing said abrasive particles, said abrasive particle consisting essentially of a diamond particle having a rough granular adherent covering consisting essentially of an outside surface coating ranging in composition from said metal to a carbide of said metal with all composition ratios of said metal and metal carbide falling within said range, and a layer of carbide of said metal intermediate said surface coating and diamond chemically bonding said surface coating to said diamond, said covering being discontinuous or continuous and covering from at least 50 percent to about 100 percent of the surface area of said diamond particle.

4. A process for producing diamond abrasive particles with a rough adherent covering which comprises providing milling balls consisting essentially of plastic or elastomer having a diameter ranging from about 1/16 inch to about ¼ inch, providing particles of a metal compound which is decomposible or reducible at atmospheric pressure at a temperature ranging from about 800° C to 1400° C to produce metal and gaseous product of decomposition, said metal compound being selected from the group consisting of molybdenum sulfide, tungsten sulfide, titanium sulfide, niobium sulfide, tantalum sulfide, chromium chloride, zirconium sulfide, and mixtures thereof, providing diamond particles ranging in size from about 10 microns to 2000 microns, milling said milling balls and said particles of metal compound and diamond mechanically smearing a coating of said metal compound onto the surface of said diamond particles coating from at least 50 percent to about 100 percent of the surface area of said diamond particles, said milling balls having a shape and sufficient elasticity and resiliency to effect said mechanical smearing, recovering the metal compound-coated diamond particles, heating said metal compound-coated diamond particles in air to oxidize said metal compound to metal oxide, and firing the resulting metal oxide-coated diamond particles in a reducing atmosphere at a temperature ranging from at least about 800° C to about 1000° C reducing the metal compound and producing said abrasive particles, said abrasive particle consisting essentially of a diamond particle having a rough granular adherent covering consisting essentially of an outside surface coating ranging in composition from said metal to a carbide of said metal with all composition ratios of said metal and metal carbide falling within said range and having a layer of carbide of said metal intermediate said surface coating and said diamond particle chemically bonding said surface coating to said diamond, said covering being discontinuous or continuous and covering from at least 50 percent to about 100 percent of the surface area of said diamond particle.

5. An abrasive particle consisting essentially of diamond particle having a rough adherent flaky granular covering, said covering consisting essentially of an outside surface coating ranging in composition from metal to a carbide of said metal with all composition ratios of said metal and metal carbide falling within said range and a layer of carbide of said metal intermediate said surface coating and said diamond particle bonding said surface coating to said diamond particle, said metal being selected from the group consisting of molybdenum, tungsten, titanium, niobium, tantalum, chromium, zirconium and alloys thereof, said covering ranging in structure from non-uniform to substantially uniform and from discontinuous to continuous and covering from at least 50 percent to about 100 percent of the surface area of said diamond particle.

6. An abrasive particle according to claim 5 wherein said outside surface coating consists essentially of up to a minor amount of said metal and said metal carbide, and wherein said covering is significantly continuous with a significantly uniform fine granular structure with a multitude of furrows distributed therein running significantly parallel to each other, said covering also being bonded to the diamond particle by tracks of metal carbide penetrating the diamond surface.

* * * * *